E. H. L. ENGLUND.
HOSE COUPLING.
APPLICATION FILED NOV. 1, 1911.
1,022,624.
Patented Apr. 9, 1912.
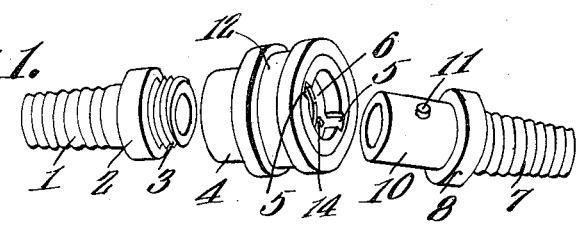
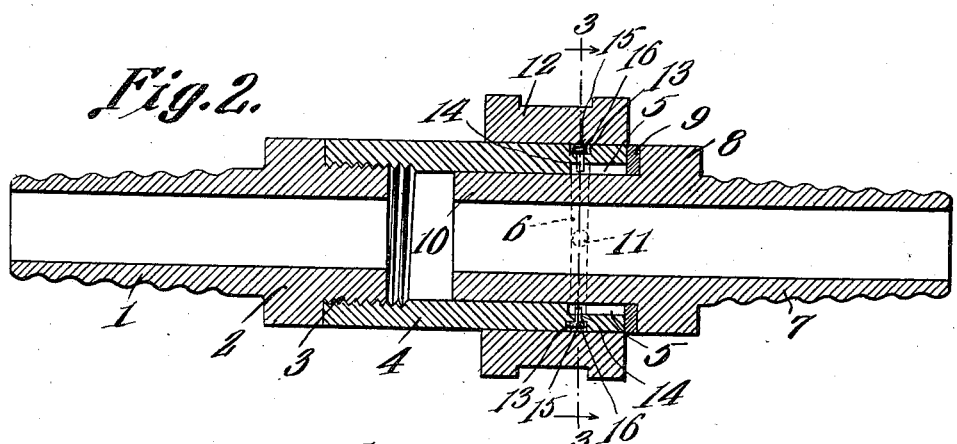
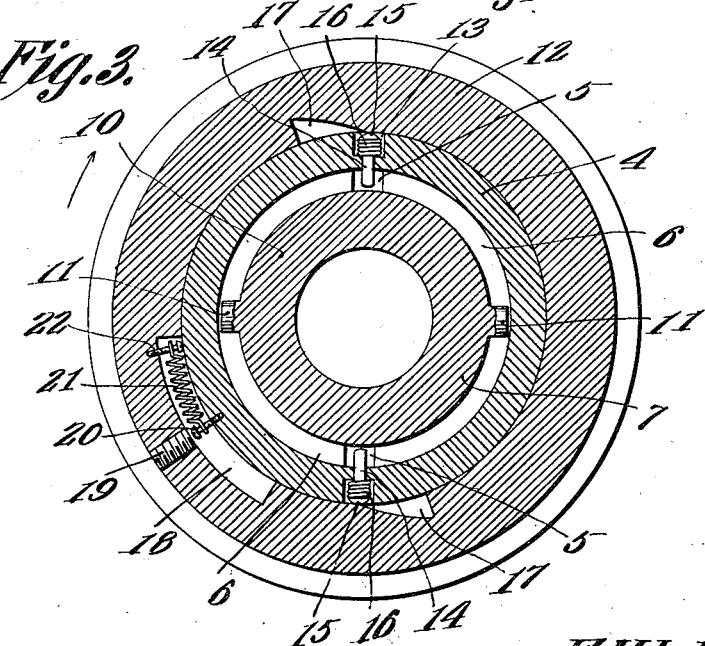
Witnesses
E. H. L. Englund,
Inventor
by
Attorneys

UNITED STATES PATENT OFFICE.

EDWIN H. L. ENGLUND, OF MUSKEGON, MICHIGAN.

HOSE-COUPLING.

1,022,624.  Specification of Letters Patent.  Patented Apr. 9, 1912.

Application filed November 1, 1911. Serial No. 658,047.

*To all whom it may concern:*

Be it known that I, EDWIN H. L. ENGLUND, a citizen of the United States, residing at Muskegon, in the county of Muskegon and State of Michigan, have invented a new and useful Hose-Coupling, of which the following is a specification.

This invention relates to improvements in hose couplings, the primary object of the invention being the provision of a quick acting coupling adapted to be connected between two sections of hose or to be connected at the hydrant for a hose connection, the same comprising essentially two members, one of which is a sleeve having mounted thereupon and being capable of an oscillatory movement, a collar, said collar being provided with a cam means and locking pins mounted in the main coupling sleeve and about which said collar fits, to be placed in locking position or releasing position, whereby the member carried by the hose may be inserted into the sleeve and the said collar moved in one direction to permit the retraction of the pins and be automatically returned by its spring in the other direction to lock the pins projected to prevent the member carried by the hose from accidentally becoming disengaged from the sleeve.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 is a perspective view of the parts of the coupling separated. Fig. 2 is a longitudinal sectional view through the complete coupling as used in connecting two hose sections. Fig. 3 is a section on an enlarged scale taken on line 3—3 of Fig. 2.

Referring to the drawings, the numeral 1 designates the hose coupling member having a shoulder 2 and threaded terminal 3, said section being used when the coupling is placed between two sections of hose, the same being dispensed with when the coupling is connected directly to a hydrant or fire plug. The sleeve 4 constitutes the main member of the coupling and is provided with a threaded portion for the reception of the threaded end 3 of the hose coupling member 1 or the threaded portion of a hydrant or fire plug when the said sleeve is used in connection therewith. In the outer end of said sleeve 4 are provided the diametrically disposed longitudinal recesses or slots 5 which terminate in the annular recess or channel 6. The member 7 is connected and is carried by a hose section, as is usual, and is provided with the shouldered portion 8 and when the parts are in connected position as viewed in Fig. 2, the rubber gasket or washer 9 is forced between the annular shoulder 8 and the outer end of the sleeve 4 to produce a water tight joint at such point. The cylindrical portion 10 of the member 7 is provided with the diametrically disposed projecting pins or studs 11 which are adapted to enter the diametrically disposed slots 5 of the member 4 and be seated within the annular recess or groove as viewed in dotted lines, Fig. 2, and in full lines in Fig. 3.

Disposed to have an oscillatory movement upon the exterior surface of the main member 4 is a collar 12, while fitted for sliding movement in the recess 13 of the sleeve, are the locking pins 14 provided with rounded heads 15 and having mounted thereon springs 16 which normally exert a tension outwardly, so that the heads of the pins are normally free for the admission into the cam slots 17 of the collar 12. Upon the inner face of the collar 12 are provided the cam slots 17 which are so constructed that the collar is moved in the direction of the arrow, Fig. 3, so that the head portion 15 of the locking pin 14 will be extended into the deepest portion thereof and the inner ends of said pins will be held beyond the inner periphery of the sleeve in the annular recess 6 of the main sleeve 4, thus permitting the insertion of the cylindrical portion 10 with the pins 11 into the member 4 as viewed in Fig. 2, so that the said pins 11 may enter the annular recess 6 and be turned to assume the position as shown in dotted lines, Fig. 2 and in full lines in Fig. 3. When the collar 12 is moved in this position it is moved against the tension of the spring 21, said spring being connected upon the stud 20 carried by the sleeve 4 also and to the pin 22 carried by the collar 12. Upon the release of the said collar 12 after the same has permitted the pins 14 to recede and the said pins 11 have assumed the position as shown in dotted lines, Fig. 2, and full lines, Fig. 3, the said spring 21 will rotate the said collar 12 in the opposite direction or until the parts assume the position as shown in Fig. 3, at which time the pins 14 will be projected so as to prevent the pins 11 from entering the slots 5 and thus hold the coupling members in locked position. In order to properly assemble the pin 20 a removable plug 19 is employed mounted in the sleeve 12 this being permissible when the parts are in the position shown in Fig. 3.

From the foregoing description taken in connection with the drawings, it is evident that the coupling constructed according to the present invention, provides a ready means whereby hose may be connected to a hydrant or fire plug member or to another section of a hose, as the sleeve or main member 4 may be connected directly to the threaded portion of a fire plug or hydrant, or carry the hose coupling section. By providing the connection between the members 4 and 7 it is seen that it is simply necessary to insert the cylindrical portion 10 so that the pins 11 aline with the slots 5, at the same time rotating the sleeve 12 so that the spring actuated pins 14 will be receded beyond the outer periphery of the annular channel 6, at which time the cylindrical portion 10 may be rotated a quarter of a revolution so that the pins 11 will be beyond the slots 5. The sleeve 12 is now released and under the action of the spring 21, will assume the position as shown in Fig. 3 forcing the pins 14 inwardly against the tension of the springs and holding the inner ends thereof across the inner ends of the slots 5 in the channeled recess 6 of the member 4, so that even though the cylindrical portion 10 may rotate, the pins or studs 11 will be prevented from entering the slot 5.

What is claimed is:

1. A hose coupling having a main member provided at its outer end with two diametrically disposed slots terminating in an annular recess, a pin disposed to be projected into the annular recess at its point of junction with the slot, a spring upon said pin for normally holding the pin out of the recess, a sleeve mounted upon the member and provided with a cam slot to form a receptacle for the pin when retracted, a spring for actuating said sleeve to cause the cam surface to project the pin within the annular recess, and another coupling member having a cylindrical portion with diametrically opposed studs to fit within the slots and recess of the first mentioned member and be locked against longitudinal movement by said spring actuated pin.

2. A hose coupling, having a main cylindrical member provided at one end with diametrically disposed slots terminating in an annular recess, spring returned pins mounted in said member and disposed to be projected into the annular recess at the junction thereof with the respective slots, a collar mounted for oscillation upon said member and provided with diametrically disposed cam surfaces, one to each pin, said cam recesses permitting the retractions of the pins from the annular recess of the member, a spring connected to the member and said collar for actuating said collar to project the pins within the annular recess of the member, and another coupling member provided with a cylindrical portion adapted to enter the cylindrical member, said cylindrical portion being provided with diametrically opposite studs to enter the slots and annular recess of the first mentioned member, the spring actuated pins of the first mentioned member preventing the studs of the last mentioned member from entering the slots when the coupling is in locked position.

In testimony that I claim the foregoing as my own, I have hereto affixed my signature in the presence of two witnesses.

EDWIN H. L. ENGLUND.

Witnesses:
 AUGUST NESBERY,
 PETER W. LOSBY.

---

Copies of this patent may be obtained for five cents each, by addressing the "Commissioner of Patents, Washington, D. C."